United States Patent
Chalasani et al.

[19]

[11] Patent Number: 6,137,266
[45] Date of Patent: Oct. 24, 2000

[54] RECHARGING CIRCUIT AND METHOD FOR RECHARGING A BATTERY HAVING A REFERENCE ELECTRODE

[75] Inventors: Subhas Chandra Chalasani; Vijayan Joseph Thottuvelil, both of Plano, Tex.

[73] Assignee: Lucent Technologies, Inc., Murray Hill, N.J.

[21] Appl. No.: 09/324,815

[22] Filed: Jun. 2, 1999

[51] Int. Cl.[7] ............................... H02J 7/00; H02J 7/04
[52] U.S. Cl. .......................................... 320/133; 320/162
[58] Field of Search .................................. 320/133, 162, 320/155, 157

[56] References Cited

U.S. PATENT DOCUMENTS

| | | | |
|---|---|---|---|
| 3,639,173 | 2/1972 | Stachurski | 320/162 |
| 3,781,657 | 12/1973 | Dennstedt | 30/DIG. 21 |
| 4,044,300 | 8/1973 | Dupuis et al. | 320/116 |
| 5,642,100 | 8/1997 | Farmer | 320/152 |
| 5,666,040 | 9/1997 | Bourbeau | 320/118 |
| 5,698,967 | 12/1997 | Baer et al. | 320/152 |
| 5,886,503 | 3/1999 | McAndrews et al. | 320/116 |
| 5,909,103 | 6/1999 | Williams | 320/134 |
| 5,945,829 | 8/1999 | Bertness | 320/150 |

*Primary Examiner*—Shawn Riley
*Assistant Examiner*—Pia Tibbits
*Attorney, Agent, or Firm*—Locke Liddell & Sapp LLP

[57] ABSTRACT

A battery recharging circuit for a valve regulated lead-acid battery having a plurality of cells, each cell including a positive electrode, a negative electrode, a DC voltage source for generating a voltage applied to the positive and negative battery electrodes, and a reference electrode includes a regenerating voltage source for selectively applying a regenerating voltage between the reference electrode and one of the battery electrodes for regenerating the reference electrode, and a reference voltage source for generating a reference voltage. The circuit further includes circuitry for measuring the voltage level between the reference electrode and a battery electrode after removal of the regenerating voltage from the reference electrode. Circuitry compares the measured voltage level to the reference voltage to generate an error correction signal. The voltage generated by the DC voltage source is adjusted based upon the error correction signal, such that the voltage of the DC voltage source applied to the battery electrodes adjusts the voltage level between the reference electrode and one of the battery electrodes to be substantially equal to the reference voltage.

8 Claims, 5 Drawing Sheets

RECHARGING CIRCUIT AND METHOD FOR RECHARGING A BATTERY HAVING A REFERENCE ELECTRODE

BACKGROUND OF THE INVENTION

Valve regulated lead-acid batteries (VRLA) are used in telecommunications and other applications to provide an energy reserve to equipment for operation when AC power is unavailable. VRLA batteries are usually connected to the output of one or more AC/DC rectifiers. The DC voltage generated by the rectifier is then used to power the equipment, commonly referred to as the load. This component configuration allows VRLA batteries to instantly provide power to the load in the event of AC failure or when one or more rectifiers becomes unavailable. VRLA batteries are usually maintained in a charged state by maintaining the rectifier voltage at a constant level at a particular temperature. Battery charging current flows until the battery is fully charged, and the battery's voltage approaches the rectifier voltage. After charging, current diminishes to a decreasing level, referred to as the float current, that is adequate to maintain the battery in a fully charged state.

One of the deficiencies of the float charging approach is that when a average voltage, for example, of 2.25 v/cell to 2.27 v/cell is applied between the positive and negative terminals of the battery, this voltage is not appropriately shared between the terminals of the battery because of the oxygen recombination reaction. The oxygen recombination reaction under normal float conditions is a spontaneous reaction which depolarizes the negative electrode of the battery. Since the battery charging is done by applying a constant voltage across the battery terminals, the depolarization on the negative terminal must be balanced by a corresponding increase in the positive electrode polarization. This imbalance causes the depolarized negative electrode to go into a self-discharge mode, which causes the battery to lose capacity with time and results in premature failure of the battery.

One method of improving battery charging is to utilize a battery having a reference electrode and a matched charging circuit.

SUMMARY OF THE INVENTION

In accordance with the present invention, a battery recharging circuit for a valve regulated lead-acid battery having a positive electrode, a negative electrode, a DC voltage source for generating a voltage applied to the positive and negative electrodes, and a reference electrode is provided. The recharging circuit includes a voltage source for selectively applying voltage between the reference electrode and one of the battery electrodes for regenerating the reference electrode surface. A reference voltage source for generating a reference voltage is provided. The circuit further includes circuitry for measuring the voltage between the reference electrode and a battery electrode. Circuitry compares the measured voltage to the reference voltage to generate an error correction signal. The voltage generated by the DC voltage source is adjusted based upon the error correction signal, such that the voltage of the DC voltage source applied to the battery electrodes adjusts the voltage between the reference electrode and one of the battery electrodes to be substantially equal to the reference voltage.

In accordance with another aspect of the present invention, a method for recharging a valve regulated lead-acid battery having a positive electrode, a negative electrode, a DC voltage source for generating a voltage applied to the positive and negative electrodes, and a reference electrode is provided. The method includes supplying a regenerating voltage between the reference electrode and one of the battery electrodes for regenerating the reference electrode. After a predetermined time, the reference electrode is disconnected from the regenerating voltage source and remains disconnected for a predetermined time period. Thereafter, the voltage between the reference electrode and the selected battery electrode is measured. A comparison is made between the measured voltage to a reference voltage for generating an error correction signal. The voltage generated by the DC voltage source is adjusted based upon the error correction signal, such that the voltage of the DC voltage source applied to the battery electrodes adjusts the voltage between the reference electrode and the selected one of the battery electrodes to be substantially equal to the reference voltage.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
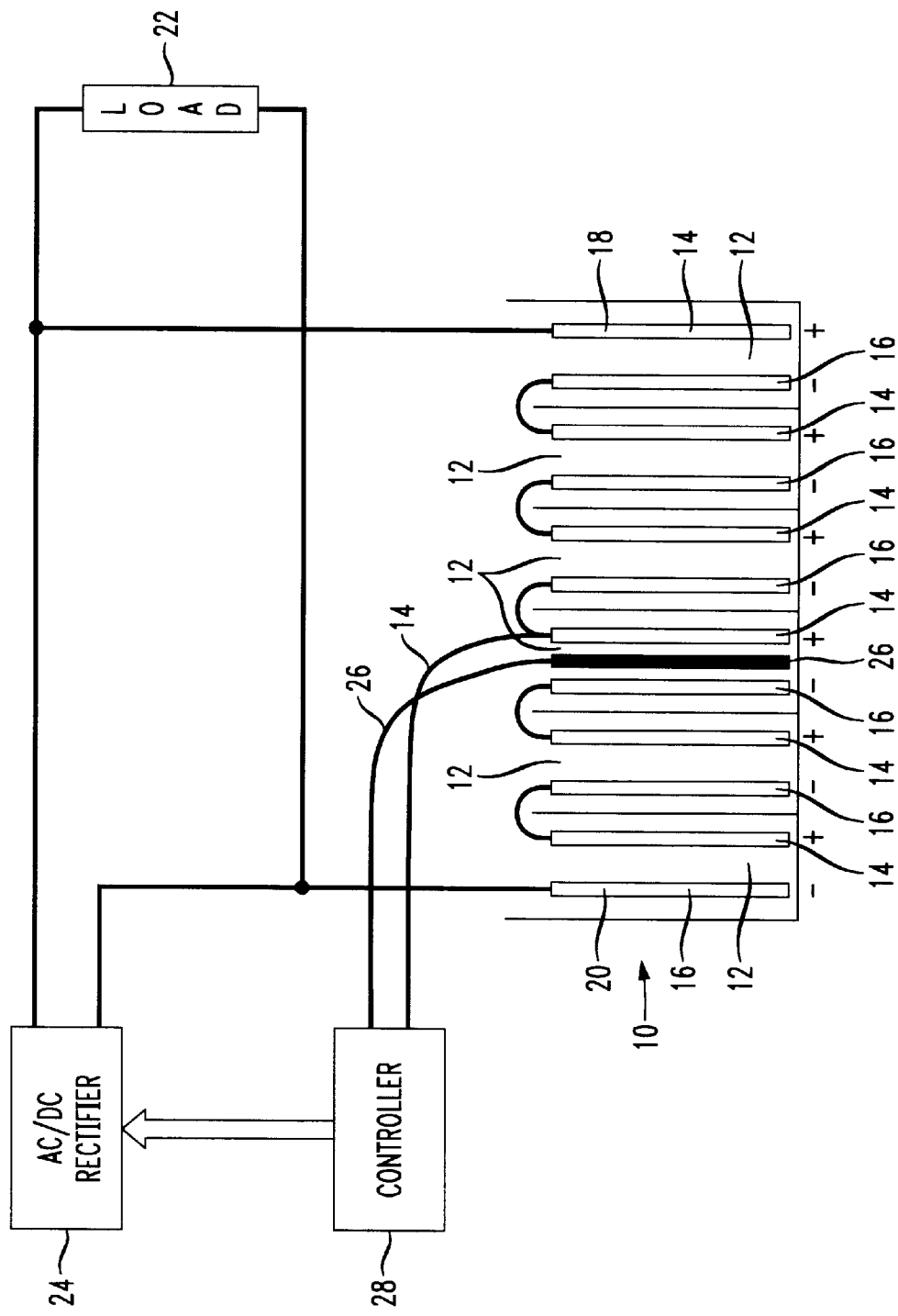
FIG. 1 is a block diagram of a system including a battery fabricated in accordance with the present invention.

Referring to FIG. 1, a valve regulated lead-acid battery is illustrated, and is generally identified by the numeral 10. Battery 10 includes a plurality of series connected cells 12. Each cell 12 includes a positive electrode 14 and a negative electrode 16. One of the electrodes 14 and 16 form positive and negative electrodes 18 and 20 of battery 10. Electrodes 18 and 20 are connected to a load 22.

Electrodes 18 and 20 of battery 10 are also connected to a AC/DC rectifier 24 which is also connected to load 22. One or more rectifiers 24 may be utilized with outputs connected in parallel. Battery 10 provides power to load 22 in the event of AC power failure or when rectifier 24 is inoperative. Battery 10 is charged through rectifier 24.

In accordance with one aspect of the present invention, battery 10 includes a reference electrode 26 disposed between electrodes 14 and 16 in one or more cells 12. A controller 28 is interconnected to reference electrode 26 and either positive electrode 14 (as shown in FIG. 1) or negative electrode 16 of a cell 12 in order to monitor the voltage between the reference electrode 26 and either positive electrode 14 or negative electrode 16 of a cell 12 within battery 10. In this manner, the float voltage of battery 10 can be adjusted by controller 28 to an optimum value for maintaining battery 10 fully charged as well as for increasing the life of battery 10 by minimizing negative electrode self discharge. Controller 28 adjusts the output voltage of rectifier 24 so that either the reference electrode 26 to positive electrode 14 voltage or reference electrode 26 to negative electrode 16 voltage is set at a desired value. A desired value is determined from the chemistry and construction of battery 10 and may vary with temperature. Where temperature is a consideration, the voltage is adjusted to maintain the reference electrode 26 voltage to either of the positive electrodes 14 or negative electrode 16 of a cell 12 voltage at an optimum value corresponding to the temperature of battery 10.

Figure 2A:
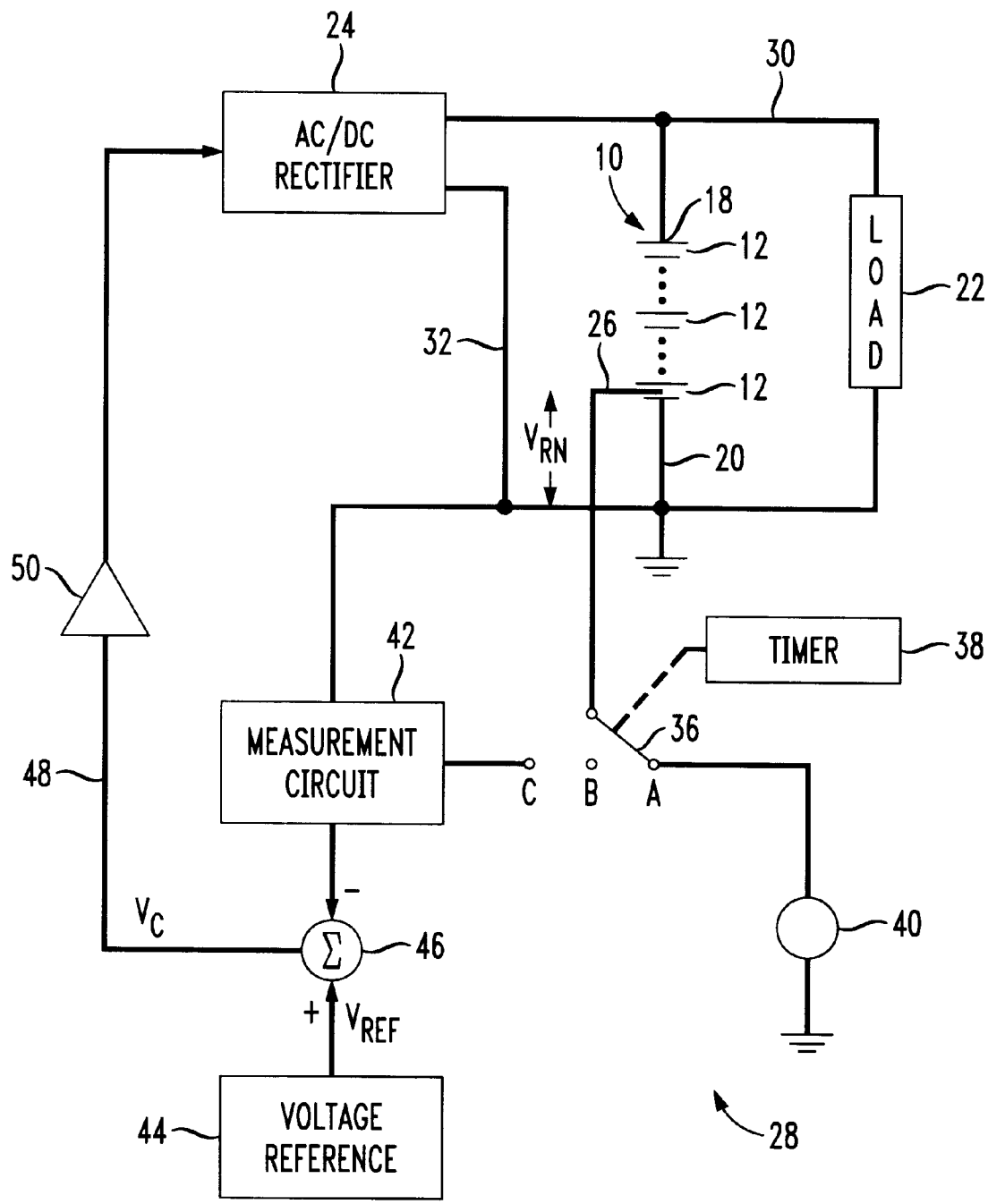
FIGS. 2a, 2b, and 2c are schematic block diagrams of the present circuit for recharging a battery having a reference electrode.

Referring now to FIG. 2a, a schematic block diagram illustrating the components of controller 28 is shown. AC/DC rectifier 24 is connected to positive electrode 18 and load 22 via line 30. AC/DC rectifier 24 is connected to negative electrode 20 and load 22 via line 32. Reference electrode 26 is connected to a switch 36. Switch 36 is operable between three positions, A, B, and C. The operation of switch 36 will subsequently be described. The positioning of switch 36 between positions A, B, and C is controlled by a timer 38. A voltage or current source 40 is interconnected to switch 36 in position A as shown in FIG. 2a.

Controller 28 further includes a measurement circuit 42 for measuring the voltage between reference electrode 26 and positive electrode 14 or reference electrode 26 and negative electrode 16 within a cell 12. A reference voltage is generated by a voltage reference source 44. A summation circuit 46 within controller 28 measures the difference between the voltage measured by circuit 42 and the reference voltage generated by source 44 to generate an error voltage Vc output along signal line 48 and amplifier 50 which is applied to AC/DC rectifier 24. The error voltage adjusts the output of AC/DC rectifier 24 so that the voltage between reference terminal 26 and either positive electrode 14 or negative electrode 16 is substantially equal to the reference voltage generated by voltage source 44. Reference electrode 26 effectively divides a cell 12 into two half cells such that the voltage between reference electrode 26 and either positive electrode 14 or negative electrode 16 can be separately measured to thereby control the voltage on both electrodes 14 and 16 to optimize charging of battery 10. Reference electrode 26 may be disposed within the separators interleaved between electrodes 14 and 16 of a cell 12 of battery 10. Reference electrode 26 may be comprised of lead or an alloy of lead similar to the fabrication of electrodes 14 and 16.

The method of the present invention will now be described, it being assumed throughout this explanation that the negative electrode 16 will be utilized, it being understood that the present method can also be utilized with reference to positive electrode 14.

Figure 3:
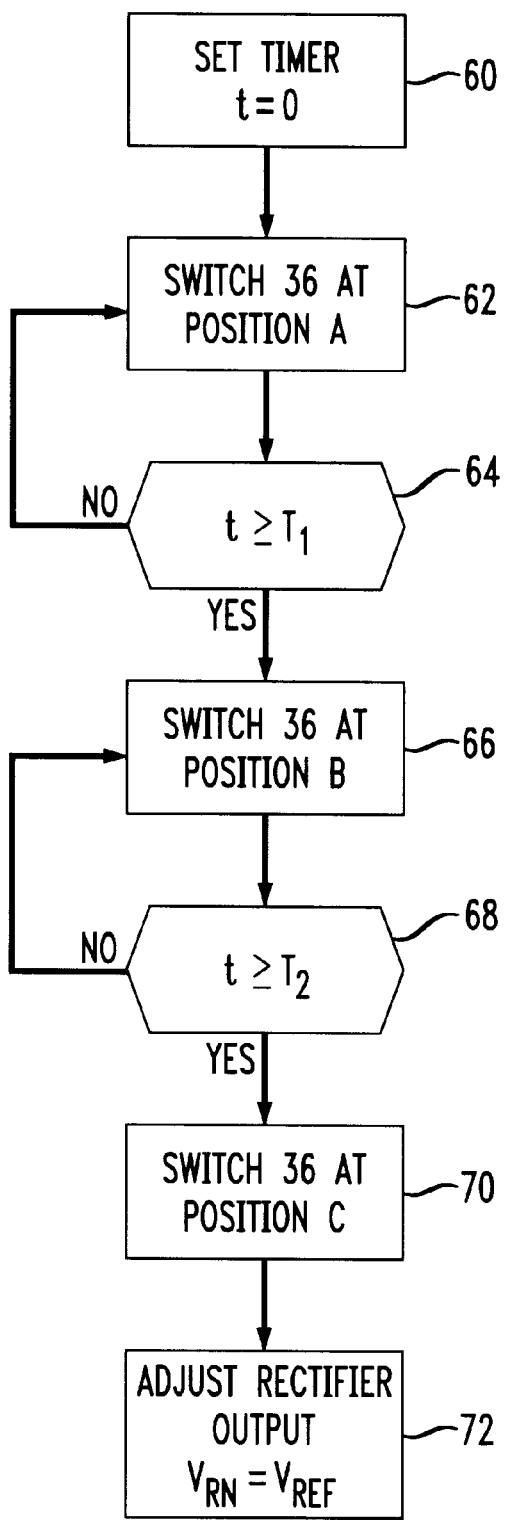
FIG. 3 is a block diagram illustrating the method of the present invention for recharging a battery having a reference electrode.

Referring to FIGS. 2a and 3, a first step involves setting timer 38 to time, t=zero at step 60. Switch 36 is positioned to position A at step 62. Source 40 is thereby interconnected to reference electrode 26 in order to regenerate reference electrode 26. A voltage is applied between reference electrode 26 and negative electrode 16 for a specified duration of time, $T_1$, at step 64. Switch 36 is maintained at position A while t is less than $T_1$. During time $T_1$, a predefined current or voltage is applied between reference terminal 26 and negative terminal 16 of a cell 12 of battery 10 via source 40.

Figure 2B:
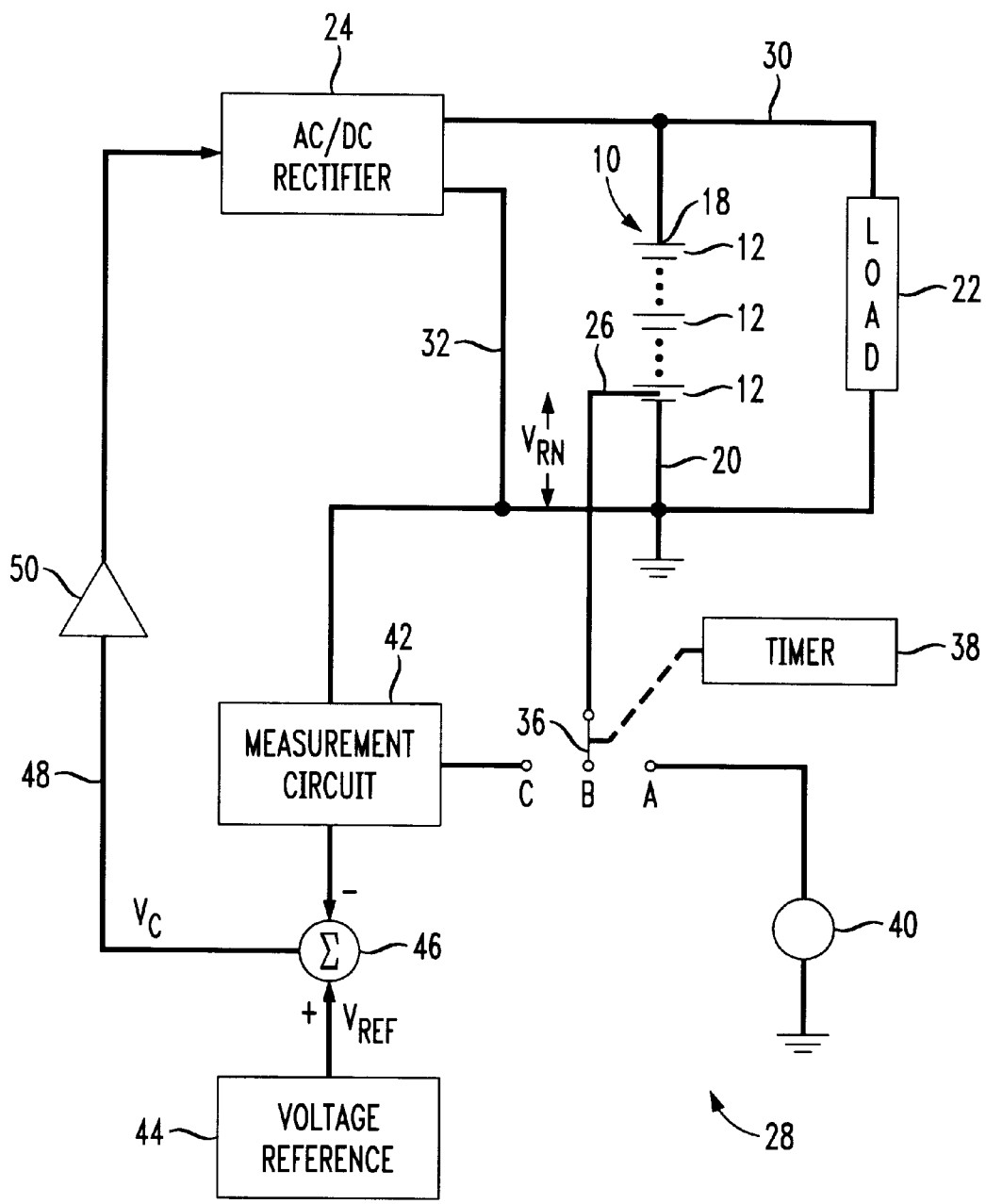
Figure 2C:
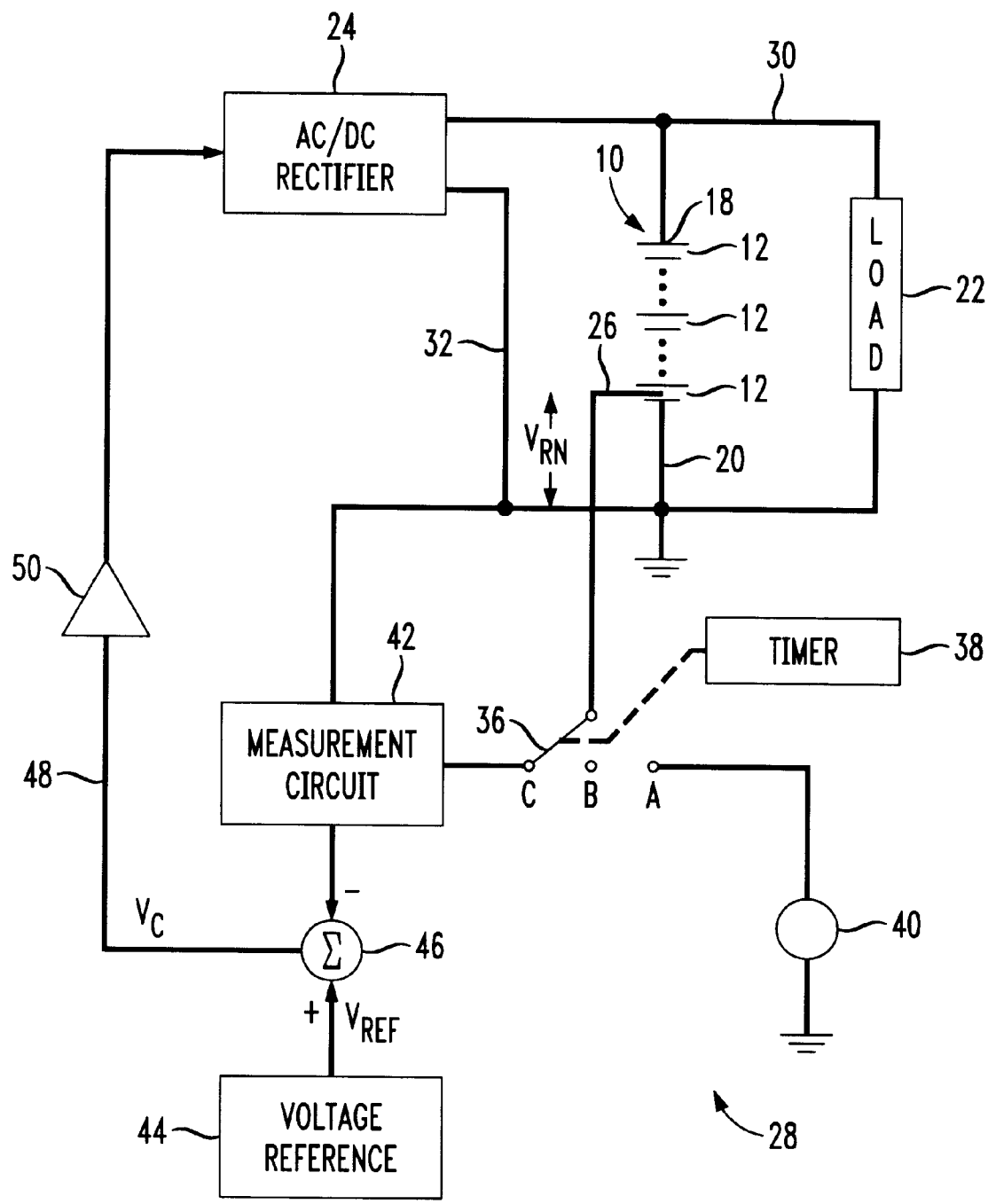

When time, t, equals or is greater than duration $T_1$, the decision at step 64 is yes, and switch 36 is moved to position B at step 66, as illustrated in FIG. 2b. Reference electrode 26 is disconnected from source 40 and remains unconnected in position B for so long as time, t, is less than a duration $T_2$ as measured at step 68. This time duration is for a recovery process. Once duration $T_2$ is past, switch 36 is moved to position C at step 70 as illustrated in FIG. 2c. The reference electrode 26 voltage $V_{RN}$ is measured at circuit 42. The measured voltage from circuit 42 is then applied to summation circuit 46 and is compared with the reference voltage generated by source 44. The resulting error voltage, $V_C$, is amplified by amplifier 50 and then forms a new reference voltage for rectifier 24 and is used to set the voltage output from rectifier 24 so that $V_{RN}$ is substantially equal to the reference voltage generated by source 44 at step 72. The error voltage, $V_C$ is continuously adjusted to maintain optimum charging conditions of battery 10. The described procedure may be repeated periodically or when battery 10 temperature changes by a predetermined amount.

Additional reference electrodes 26 may be utilized in the present circuit for monitoring multiple reference electrode to terminal voltages within multiple cells 12 and to generate a single voltage which is used to control battery voltage. Additionally, in lieu of voltage source 44, a stored value in tables containing voltage level versus temperature may be utilized to select the appropriate level to which the reference electrode to terminal voltage is to be compared for a particular battery 10 temperature.

It therefore can be seen that through the use of a reference electrode, and by monitoring the voltage between the reference electrode and either a positive or negative terminal of a VRLA cell, the float voltage can be adjusted to the optimum value that functions to maintain the battery charged while increasing battery life by minimizing negative electrode self discharge.

Whereas the present invention has been described with respect to specific embodiments thereof, it will be understood that various changes and modifications will be suggested to one skilled in the art and it is intended to encompass such changes and modifications as fall within the scope of the appended claims.

What is claimed is:

1. A battery recharging circuit for a valve regulated lead-acid battery having a positive battery electrode, a negative battery electrode, a DC voltage source for generating a voltage applied to the positive and negative battery electrodes, and a reference electrode, the circuit comprising:

a voltage source for selectively applying a voltage between the reference electrode and a selected one of the battery electrodes for regenerating the reference electrode;

a reference voltage source for generating a reference voltage;

means for measuring a voltage between the reference electrode and said selected one of the battery electrodes;

means for comparing said voltage measured between the reference electrode and said selected one of the battery electrodes to said reference voltage to generate an error correction signal; and means for adjusting the voltage generated by the DC voltage source based upon said error correction signal, such that the voltage of the DC voltage source applied to the battery electrodes is adjusted to thereby adjust said voltage between the reference electrode and said selected one of the battery electrodes to be substantially equal to said reference voltage.

2. The circuit of claim 1 and further including:

a switch for selectively connecting said voltage source to the reference electrode and for connecting the reference electrode to said means for measuring.

3. The circuit of claim 2 and further including:

a timer for controlling said switch, such that a time delay occurs after said voltage is removed from the reference electrode and before the reference electrode is connected by said switch to said means for measuring.

4. A battery recharging circuit for a valve regulated lead-acid battery having a positive battery electrode, a negative battery electrode, a DC voltage source for generating a voltage applied to the positive and negative battery electrodes, and a reference electrode, the circuit comprising:

a voltage source for selectively applying a voltage between the reference electrode and a selected one of the battery electrodes for regenerating the reference electrode;

a reference voltage source for generating a reference voltage;

a detector connected between the reference electrode and said selected one of the battery electrodes for measuring a voltage between the reference electrode and said selected one of the battery electrodes, and for generating a reference electrode voltage;

a comparator connected between said detector and said reference voltage source for comparing said reference electrode voltage to said reference voltage to generate an error correction signal; and an amplifier for applying said error correction signal to the DC voltage source for adjusting the voltage generated by the DC voltage source based upon said error correction signal, such that the voltage of the DC voltage source applied to the battery electrodes is adjusted to thereby adjust said voltage between the reference electrode and said selected one of the battery electrodes to be substantially equal to said reference voltage.

5. The circuit of claim 4 and further including:

a switch for selectively connecting said voltage source to the reference electrode and for connecting the reference electrode to said detector.

6. The circuit of claim 5 and further including:

a timer for controlling said switch, such that a time delay occurs after said voltage is removed from the reference electrode and before the reference electrode is connected by said switch to said detector.

7. A method for recharging a valve regulated lead-acid battery having a positive battery electrode, a negative battery electrode, a DC voltage source for generating a voltage applied to the positive and negative battery electrodes, and a reference electrode, comprising:

applying a voltage from a source between the reference electrode and a selected one of the battery electrodes for a time duration for regenerating the reference electrode;

measuring a voltage between the reference electrode and the selected one of the battery electrodes after removing the voltage source from the reference electrode;

comparing the measured voltage between the reference electrode and the selected one of the battery electrodes to a reference voltage to generate an error correction signal; and adjusting the voltage generated by the DC voltage source based upon the error correction signal, such that the voltage of the DC voltage source applied to the battery electrodes is adjusted to thereby adjust the voltage level between the reference electrode and the selected one of the battery electrodes to be substantially equal to the reference voltage.

8. The method of claim 7 and further including:

disconnecting the reference electrode from the voltage source for a predetermined time duration before measuring the voltage level between the reference electrode and the selected one of the battery electrodes.

* * * * *